(No Model.) 2 Sheets—Sheet 2.
J. HANSSON.
SEED PLANTER.
No. 492,920. Patented Mar. 7, 1893.
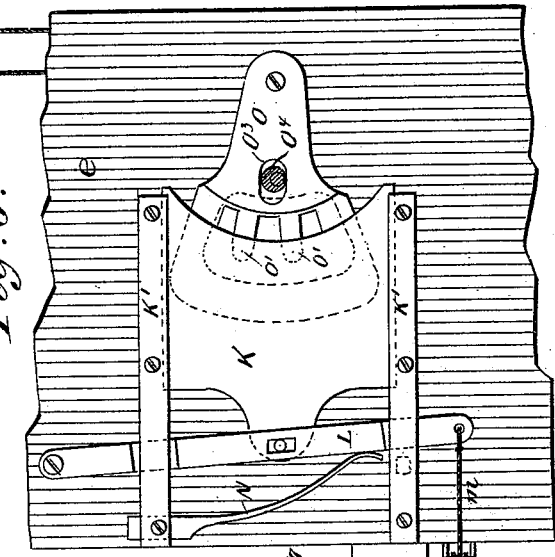
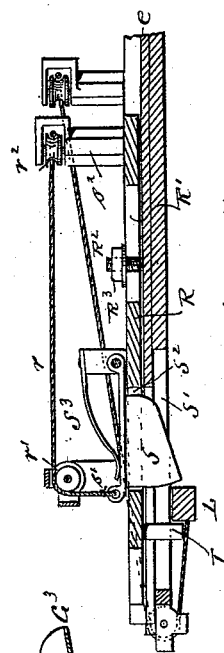
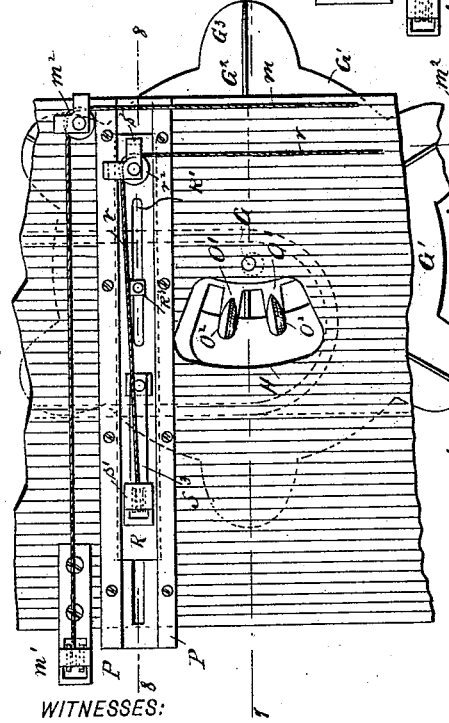
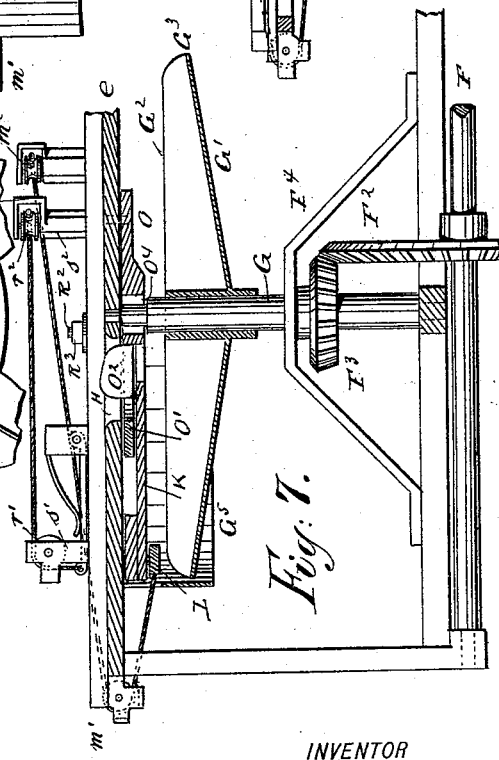
WITNESSES:
Charles Schroeder
Carl P. Griepel.
INVENTOR
J. Hansson.
BY Joseph Paegner
ATTORNEYS.
THE NORRIS PETERS CO., PHOTO-LITHO., WASHINGTON, D. C.

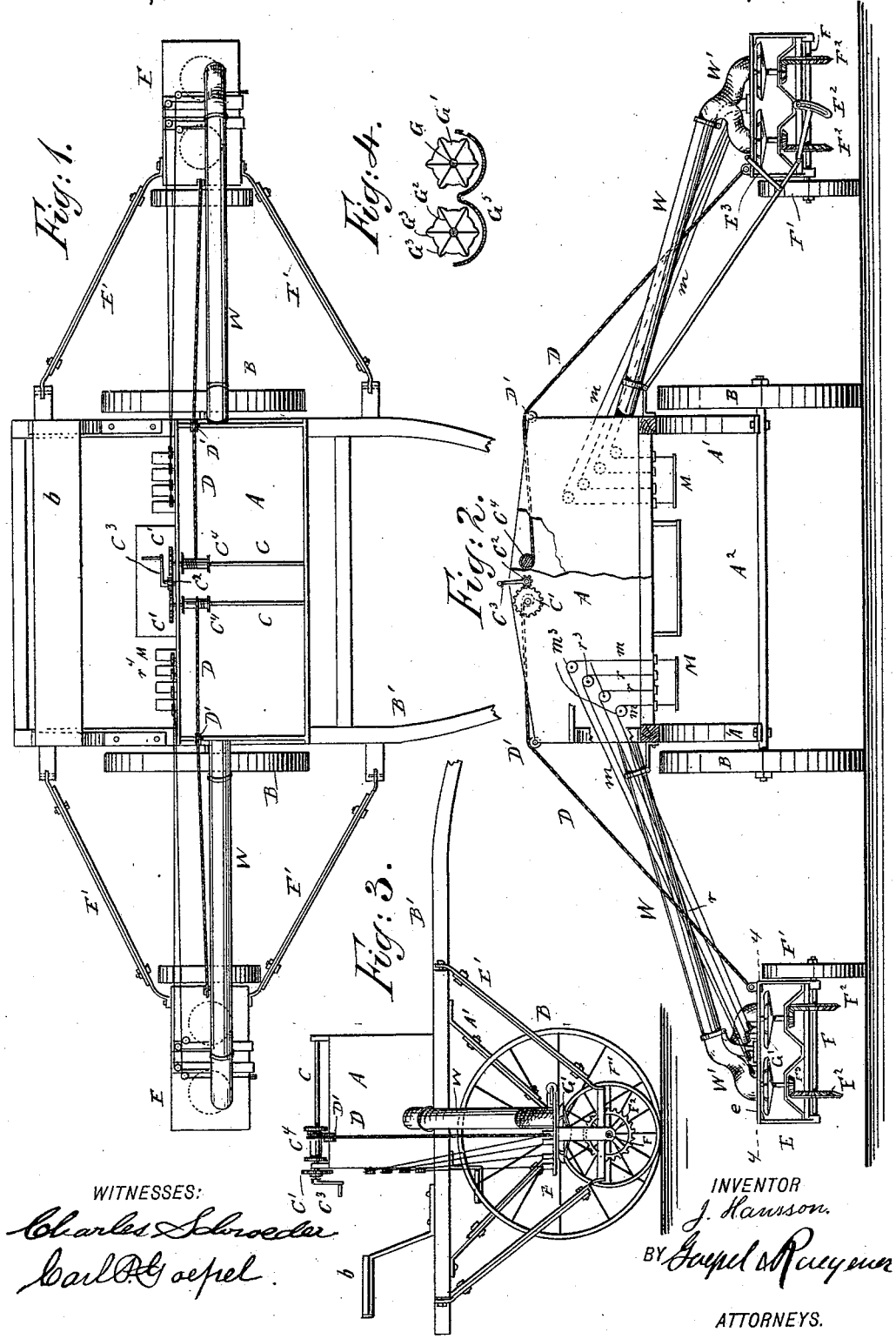

UNITED STATES PATENT OFFICE.

JOHN HANSSON, OF NEW YORK, N. Y.

SEED-PLANTER.

SPECIFICATION forming part of Letters Patent No. 492,920, dated March 7, 1893.

Application filed October 24, 1892. Serial No. 449,740. (No model.)

*To all whom it may concern:*

Be it known that I, JOHN HANSSON, a citizen of Sweden, and a resident of New York city, in the county and State of New York, have invented certain new and useful Improvements in Seed-Planters, of which the following is a specification.

This invention relates to improvements in planters; and the object of my invention is to provide a new and improved seed-planter which throws the seed broadcast and which can easily be adapted for throwing seeds of any size and kind and permits of controlling the planting operation with ease from the driver's seat.

The invention consists in the combination with a seed box, of frames connected with the same, by hinged braces, seed distributers in said frame, chutes extending from the seed box to the seed distributers and ropes and pulleys for raising the seed-distributing frames.

The invention also consists in the construction and combination of parts and details which will be fully described hereinafter and finally pointed out in the claims.

In the accompanying drawings, Figure 1 is a plan-view of my improved seed planter. Fig. 2 is a rear-end-view of the same, parts being broken out and others in section. Fig. 3 is a side-view of the same, parts being broken out. Fig. 4 is a detail horizontal sectional view, on the line 4 4, Fig. 2. Fig. 5 is an enlarged detail plan-view of the seed thrower. Fig. 6 is a plan view of the under side of the same and Figs. 7 and 8 are transverse sectional views, on the lines 7 7 and 8 8 of Fig. 5 respectively.

The seed box A is provided on its under side with two hangers A', in which the axle $A^2$ is held, and on the ends of which the supporting wheels B B are mounted.

B' B' are vehicle shafts.

In the front and rear walls of the box A two shafts C C are mounted to turn, each provided on the rear end with a cog-wheel C' engaging a pinion $C^2$ having a crank-handle $C^3$, so that by turning said crank-handle $C^3$ the shafts C C are turned in opposite directions. Each shaft carries a pulley or drum $C^4$, to which one end of a rope or cable D is fastened, said ropes passing over guide-pulleys D' on the top edges of the seed-box and their lower ends being fastened to U-shaped frames E, of which one is provided at each side of the box, which frames are connected by two braces E' with the sides of the box A and the shafts, which braces E' are hinged at their upper and lower ends. The free lower end of each brace E' is held in a segmental slotted piece $E^2$ on a frame E to permit of adjusting said frames E in horizontal position, and each brace E' is connected by a rod $E^3$ with the top of the corresponding frame E. By winding the ropes or cables D D on the drums $C^4$ $C^4$ the two frames E can be swung up with the braces E' E' until the latter are in a vertical position, so that the planter occupies less space.

In each frame E an axle F is mounted, on the inner side of which a driving wheel F' is fixed. On each shaft F two bevel cog-wheels $F^2$ are fixed, each engaging a pinon $F^3$ of a vertical shaft G journaled in the top and bottom of frame E, and in a stirrup-piece $E^4$ of said frame, so that when the planter moves along the shafts G G are rotated from the axle F. On each shaft G a slightly funnel-shaped circular plate G' is fixed that is provided with radial ribs $G^2$ on its upper surface and a lip $G^3$ on the outer edge of said plate at the outer end of each rib, as shown in Fig. 4. A semicircular guard-plate $G^5$ is fastened to the top e of the frame E adjacent to the rear side of each plate G'. The top plate e of each frame E is provided with an aperture H and below the same a sliding plate K is arranged, which is mounted to slide between two guides K' fixed to the under side of the plate e and each sliding plate or gate is pivotally connected with a lever L pivoted on the under side of the top plate e, the free end of said lever being connected with a cord m, which passes over a guide pulley m' on the front edge of the plate e, over a guide pulley $m^2$ at the rear edge of the plate e and then passes over a pulley $m^3$ on the rear of the box A, and has its lower end connected with the foot-plate M. As there are two plates K on the under side of the top plate e of each frame E two cords m extend to the back of the box A at each side of the same, and both of said cords are connected with the foot-plate M as shown in Fig. 2. A spring N acts on each lever L and serves to press the same and the plate K in such a direction as to close the opening H in the top plate e. On the under side of the plate e an oscillating plate O is pivoted that is provided on its free end with a number of teeth. O', from the upper surface of which the wings O² project upward into the opening H, said plate oscillating between the under side of the plate e and the upper surface of the plate K, as shown. Each oscillating plate O is provided with a slot O³, in which an eccentric O⁴ works that is formed on the shaft G, so that as the shaft G rotates said plate O is oscillated.

Between two guides P P on the upper surface of the plate e an adjustable sliding piece R is arranged, that has a longitudinal slot R', through which a fixed screw R² projects from the top of plate e, and on said screw a nut R³ is screwed, so that after the sliding piece R has been adjusted it can be locked in any desired position by tightening the nut R³. To said sliding piece a wedge-shaped latch S is pivoted, that projects through a transverse slot S' in the top plate e and through a slot S² in the sliding piece R, which latch is pressed downward by a spring S³. A cord r is attached to the free end of the latch S, passes over the pulleys r' r² on the standards s' s² on the sliding piece R and then over a pulley r³ on the rear of the box A, and its lower end is connected with the plate r⁴. Two cords r pass up from each frame E to the corresponding side of the rear part of the box, as shown in Fig. 2. Tooth T projects downward from the sliding piece R in front of and adjacent to the lever L, as shown in Fig. 8. Two hinged chutes W extend down from the seed box A to each frame E and are provided at their lower ends with the branches W' leading to the openings H H in the top plates e.

The driver's seat b is arranged on the vehicle frame behind the seed box A.

The operation is as follows:—The two frames E are lowered until the wheels F' are in contact with the ground. As the planter is pulled forward the wheels F' rotate and rotate the disks or plates G' and oscillate the plates O. The seeds drop from the chutes W', pass through the aperture H and drop upon the rotating plates G', by which they are thrown broadcast over the fields. The oscillating plates O agitate the seeds and prevent them from clogging in aperture H. The plate K is adjusted according to the size of the seeds, so as to leave a greater or less opening between the teeth of the plate O, as shown, for example, in Fig. 6. This adjustment is accomplished by setting the slide R whereby the plate K is moved a greater or less distance toward the shaft G and exposes more or less of the opening between the teeth on the plate O. After the slide R has been adjusted it is locked in place by means of the nut R³. Ordinarily the spring N keeps the plate K in such a position as to close the openings.

When the planting is to begin, the corresponding cord m is pulled, whereby the lever L passes under the latch S into the position shown in Fig. 8 and is locked in place thus keeping the opening clear. The seeds now drop through the opening in the manner described and the sowing continues until the corresponding cord r is pulled, whereby the latch S is raised sufficiently to clear the lever L, whereupon the spring N throws the lever L and plate K in the direction toward the right, Fig. 6, closing the opening through which the seed passes. The driver thus has the planter in full control and can at any minute stop the flow of seed or start the same, as he may see fit, by simply moving the corresponding lever with one of his feet.

The driver may use only one seed distributing wheel G' at either side or both, or he can use the planting apparatus on one side and dispense with the apparatus on the other side, as may be necessary.

Having thus described my invention, I claim as new and desire to secure by Letters Patent—

1. A seed planter, constructed with a seed box, frames connected by pivoted braces with the sides of the seed box, pulleys and ropes for raising and lowering said frames, seed distributers in the frames, a wheel on each frame and gearing for operating the seed distributers, substantially as set forth.

2. In a seed planter, the combination with a seed box of frames connected by pivoted braces with the seed box, seed distributers in each frame, a chute extending from the seed box to each frame, a wheel on each frame, gearing operated from said wheels for operating the seed distributers, slides for closing the openings through which the seed passes to the distributers and cords extending from said slides to a driver's seat behind the seed box, for operating said gates, substantially as set forth.

3. In a seed planter, the combination with a seed box mounted on wheels, of a frame connected with the seed box by pivoted braces, a driving wheel on each frame, a seed distributer in each frame, gearing for rotating the seed distributers from the driving wheels, a chute for conveying seeds from the seed box to the seed distributers, a gate for each chute, cords for operating said gate from the seed box, a latch for locking said gate in place and a cord for operating said latch from the seed box, substantially as set forth.

4. In a seed-planter, the combination, with a seed-box, of a frame suspended from the side of the same, a rotating seed-distributing plate having radial projections, gearing for rotating said seed-distributing plate and its shaft, a pivoted vibrating plate above said seed-distributing plate, which vibrating plate is operated from the shaft of the seed-distributing plate, a sliding gate for closing an opening through which the seeds pass, a latch for locking said gate to the seed box and pulleys over which said cords are guided, substantially as set forth.

5. In a seed-planter, the combination, with a seed-box, of a frame held at the side of the same, a rotating shaft in said frame, gearing for rotating said shaft, a seed-distributing plate fixed on the shaft, a vibrating plate above the shaft, a vibrating plate above the seed-distributing plate, and operated from the shaft of said seed-distributing plate, a latch for locking said plate in place, an adjustable slide carrying said latch and cords extending from said gate and said latch to the seed box and pulleys over which said cords are guided, substantially as set forth.

In testimony that I claim the foregoing as my invention I have signed my name in presence of two subscribing witnesses.

JOHN HANSSON.

Witnesses:
SUEN HOLM,
OSCAR F. GUNZ.